United States Patent [19]

Teramachi

[11] Patent Number: 4,557,156
[45] Date of Patent: Dec. 10, 1985

[54] ROTARY-TO-LINEAR CONVERTER WITH ROLLING BALLS, AND FEED MECHANISMS INCORPORATING THE SAME

[76] Inventor: Hiroshi Teramachi, 2-34-8, Higashi-Tamagawa, Setagaya-Ku, Tokyo, Japan

[21] Appl. No.: 448,171

[22] Filed: Dec. 9, 1982

[30] Foreign Application Priority Data

Dec. 29, 1981 [JP] Japan .................. 56-214817

[51] Int. Cl.$^4$ .............. F16H 55/17; F16H 55/22; F16H 1/18; F16H 1/20
[52] U.S. Cl. ................. 74/459; 74/89.14; 74/89.15; 74/424.8 R; 74/441
[58] Field of Search .......... 74/424.8 NA, 89.15, 74/89.14, 409, 441, 459, 440, 458, 216.3, 74/424.8 A, 424.8 R, 457

[56] References Cited

U.S. PATENT DOCUMENTS

| | | | |
|---|---|---|---|
| 2,895,343 | 7/1959 | Orner | 74/441 |
| 2,936,645 | 5/1960 | Morris et al. | 74/441 |
| 2,978,920 | 4/1961 | Sears et al. | 74/409 |
| 3,156,133 | 11/1964 | Anthony | 74/441 |
| 3,393,575 | 7/1968 | Irwin | 74/441 |
| 3,393,576 | 7/1968 | Carlson | 74/441 |
| 3,393,577 | 7/1968 | Better | 74/441 |
| 3,851,541 | 12/1974 | Ploss et al. | 74/441 |
| 4,000,664 | 1/1977 | Christensen | 74/424.8 R |
| 4,148,226 | 4/1979 | Benton | 74/89.15 |
| 4,438,986 | 3/1984 | Teramachi | 74/424.8 R |

FOREIGN PATENT DOCUMENTS

2648550  5/1977  Fed. Rep. of Germany... 74/424.8 A
563529  7/1977  U.S.S.R. .................. 74/424.8 NA Primary Examiner—Leslie A. Braun
Assistant Examiner—Michael D. Bednarek
Attorney, Agent, or Firm—Armstrong, Nikaido, Marmelstein & Kubovcik

[57] ABSTRACT

A ball nut is sleeved upon a worm via one or more, preferably two, groups of antifriction balls capable of rolling along internal and external screw threads on the ball nut and the worm. Two crosscuts are formed across the internal thread on the ball nut in axially spaced, diametrically opposite positions thereon, each for intercommunicating two neighboring turns of the helical groove therein. Each crosscut is concaved to provide a bypass for one group of balls around the thread on the worm. Thus each group of balls recirculate along one turn of the helical groove in the ball nut, making it possible for the worm to travel axially in response to the rotation of the ball nut. The converter further includes an antifriction bearing having an outer ring surrounding the ball nut via rolling elements confined therebetween, with the ball nut serving as the inner ring of the bearing. There are also disclosed herein feed mechanisms incorporating one and two such rotary-to-linear converters respectively. In either case the ball nut is gear-driven by an electric motor to cause relative endwise movement of the worm together with an object to be fed.

19 Claims, 18 Drawing Figures

ROTARY-TO-LINEAR CONVERTER WITH ROLLING BALLS, AND FEED MECHANISMS INCORPORATING THE SAME

BACKGROUND OF THE INVENTION

This invention deals with devices for converting rotary motion into recilinear motion, and is directed more specifically to such a rotary-to-linear converter of the type having a worm and a ball nut, with a plurality or multiplicity of antifriction balls rollably engaged between their opposed screw threads to translate the rotation of either into the rectilinear travel of the other. The invention also specifically concerns feed mechanisms incorporating one or two such rotary-to-linear converters.

Rotary-to-linear converters of the worm-and-ball-nut type, also described as the recirculating ball type in the art, convert sliding friction into rolling friction by virtue of the rolling balls. Because of the minimal frictional resistance between the mating parts, the devices of this class have found extensive use as feed mechanisms of machine tools and other pieces of machinery.

As heretofore constructed, however, the worm-and-ball-nut assemblies have possessed some drawbacks. One of these concerns the tubular ball return guides conventionally employed for recirculating the balls. After making from one and a half to three revolutions around the worm, the balls enter the return guide and roll back to the initial point between the worm and the ball nut by making approximately one turn around the ball nut. The ball return guides are curved with a radius less than that of the ball nut. Such curves adversely affect the smooth travel of the balls through the return guides and give rise to noise. The smooth recirculation of the balls is a prerequisite for the efficient, frictionless reative rotation and axial movement of the worm and the ball nut.

Another problem with the prior art is the axial play or backlash between the worm and the ball nut. The backlash is an unfailing cause of uneven wear, noise, and the poor response with which either of the worm and the ball nut starts travelling axially upon rotation of the other. A conventional remedy for this defect has been to split the ball nut into a pair of halves, along a plane normal to its axis, and to place an intermediate ring therebetween for preloading the two groups of balls on its opposite sides either toward or away from each other. The splitting of the ball nut necessitates, of course, the reinforcement of the ball nut assembly including the intermediate ring, thus making difficult the manufacture and assemblage of the device.

A further disadvantage of the known rotary-to-linear converters has manifested itself in rotatably mounting the ball nut to some external part. The antifriction bearing used for this purpose is almost invariably of the rolling-element type, comprising one or more rows of rolling elements, normally balls, interposed between two concentric rings or races. Placed around the ball nut, the bearing of this conventional design makes the complete device inconveniently bulky for use as a feed mechanism.

It is also a disadvantage of the prior art that the opposite axial ends of the ball nut have been left open, inviting the intrusion of dust and other foreign matter into the tubular space between the worm and the ball nut. The accumulation of dust or the like on the opposed surfaces of the worm and the ball nut seriously impedes the smooth rolling of the balls along their threads and, in consequence, the smooth relative motion of the worm and the ball nut.

An additional problem appears in the use of the worm-and-ball-nut assembly as a feed mechanism. According to a typical conventional feed mechanism of this type the ball nut is coupled to an object to be fed, such as the table of a machine tool. The worm, on the other hand, is geared at one end to a drive motor and is journaled at the other end in a bearing, with the drive motor and the bearing being both supported on a stationary part. Thus the rotation of the worm results in the axial movement of the ball nut together with the object coupled thereto. This prior art construction invites the problem of the critical speed of the worm, that is, the angular speed at which the worm becomes dynamically unstable with large lateral amplitudes, due to resonance with the natural frequencies of lateral vibration of the worm. The worm must therefore be revolved at safely less than the critical speed even for moving the desired object at high speed, thus setting a limit on the quick feeding of the object.

It has been suggested to circumvent worm resonance by making the lead angles of the screw threads of the worm and the ball nut very large, to such an extent that the desired object may be fed at high speed at a relatively low revolving speed of the worm. Screw threads with such a great lead angle are, however, very difficult to cut on the inner face of the ball nut with any acceptable degree of accuracy. Further an increase in the lead angle leads to the reduction of the force with which the ball nut is thrusted axially on the worm, and also makes difficult the accurate positioning of the object.

SUMMARY OF THE INVENTION

The present invention seeks to eliminate the conventional ball return guides from a worm-and-ball-nut type rotary-to-linear converter and hence to make possible the smoother, more frictionless relative movement of the worm and the ball nut and to reduce the production of noise by the recirculating balls.

The invention also seeks to incorporate an antifriction bearing into the rotary-to-linear converter, for use in rotatably mounting the ball nut to some external part, without inconveniently increasing the outside diameter of the overall device.

The invention also seeks to preload the rolling balls between the worm and the ball nut without splitting the ball nut or without use of any additional part and hence to effectively eliminate backlash between the worm and the ball nut.

The invention also seeks to prevent the intrusion of dust and other foreign matter into the ball nut in order to assure the smooth rolling of the balls between the worm and the ball nut for an extended length of time.

Stated in its broadest aspect, the invention provides a rotary-to-linear converter comprising a worm, a ball nut concentrically sleeved upon the worm, and a plurality of antifriction balls interposed between the worm and the ball nut for rolling motion along the external and internal screw threads cut thereon. For recirculating the balls, at least one crosscut is formed across the internal thread on the ball nut so as to intercommunicate two adjoining turns of the helical groove therein. Adapted to provide a bypass for the balls around the thread on the worm, the crosscut enables the balls to recirculate along essentially one turn of the helical groove in the ball nut. The converter further includes an antifriction bearing having an outer ring concentrically surrounding the ball nut via a plurality of rolling elements confined therebetween.

Thus the rotary-to-linear converter in accordance with the invention dispenses with the long-familiar ball return guides, having instead at least one crosscut across the internal thread on the ball nut for the recirculation of the balls along one turn of the helical groove therein. This method of ball recirculation makes possible the smoother and more noiseless relative movement of the worm and the ball nut than hitherto.

The elimination of the ball return guides from the outside of the ball nut also makes it possible to use the ball nut as the inner ring of the bearing for use in rotatably mounting the ball nut to some external part. Accordingly the bearing included in the inventive device, as in the foregoing summary, comprises only the outer ring and the rolling elements confined between this outer ring and the ball nut itself serving as the inner ring. With its outside diameter thus reduced, the device including the bearing demands a far less installation space than in the case where the ball nut is journaled in a self-contained bearing.

In a preferred embodiment the ball nut has two crosscuts formed in axially spaced, diametrically opposite positions thereon to allow two separate groups of antifriction balls to recirculate each along one turn of the helical groove in the ball nut. In this embodiment one turn of the helical groove in the ball nut, located intermediate the groove turns along which the two groups of balls recirculate, is made different in width from the other turns, with the result that the two groups of balls are preloaded in the opposite axial directions of the ball nut. The preloading of the balls eliminates backlash from between the worm and the ball nut, resulting in the quicker response, smaller noise, less uneven wear, and longer useful life of the converter. The rigidity of the complete device is also materially enhanced as a result of the preloading of the balls, so that the relative axial positions of the worm and the ball nut can be more definitely determined.

Also in the preferred embodiment the bearing takes the form of a double-row ball bearing. The outer ring of this bearing is split for preloading the two rows of balls in the opposite axial directions of the bearing. The preloading of the bearing balls combines with the preloading of the converter balls to make the device positive and reliable in operation and durable in construction.

A further feature of the invention resides in a pair of sealing rings formed coaxially at the opposite ends of the ball nut and directed inwardly therefrom into sliding contact with the worm. Molded from a relatively rigid, wear-resistant material, the sealing rings function to prevent the intrusion of foreign matter into the ball nut and to assure the smooth, aligned rolling of the group or groups of balls between the worm and the ball nut for an extended period of time.

According to another aspect of the invention there is provided a feed mechanism wherein the rotary-to-linear converter of the above outlined configuration is adapted for feeding a movable member, such as the table of a machine tool, along a rectilinear track over a stationary member such as the machine tool bed. The worm of the rotary-to-linear converter is fixedly mounted on the underside of the movable member and oriented parallel to the track for axial movement with the movable member relative to the stationary member. The outer ring of the bearing, which makes use of the ball nut as its inner ring as aforesaid, is fixedly supported on the stationary member, so that the ball nut is rotatable relative to the worm but is prevented from axial movement relative to the stationary member. Thus, by imparting bidirectional rotation to the ball nut from drive means on the stationary member, the movable member can be moved back and forth along the track together with the worm.

It will be appreciated that in the feed mechanism constructed as above, the worm does not rotate and so is free from the problem of resonance. The desired object can therefore be moved at high speed with use of the worm and the ball nut having their threads cut at a normal lead angle. As has been stated, screw threads with such a normal lead angle are easy to cut with great accuracy and serve to increase the axial thrust exerted on the worm by given torque applied to the ball nut. Also the precise positioning of the movable member becomes possible.

Another feed mechanism disclosed herein incorporates two rotary-to-linear converters sharing the worm, for feeding the movable member at high and extremely low speeds. The two-speed feed mechanism is also well calculated to gain the advantages of the first described feed mechanism and to derive the full benefits from the rotary-to-linear converters each constructed as in the foregoing.

The above and other features and advantages of this invention and the manner of attaining them will become more apparent, and the invention itself will best be understood, from a study of the following description of some preferred embodiments taken together with the attached drawings.

DESCRIPTION OF THE PREFERRED EMBODIMENTS

Figure 1:
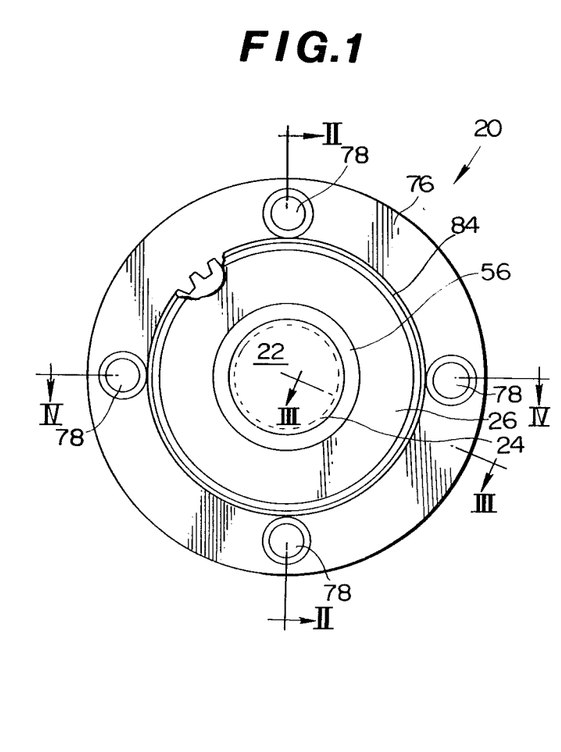
FIG. 1 is an end elevation of a preferred form of the rotary-to-linear converter constructed in accordance with the principles of this invention.
Figure 2:
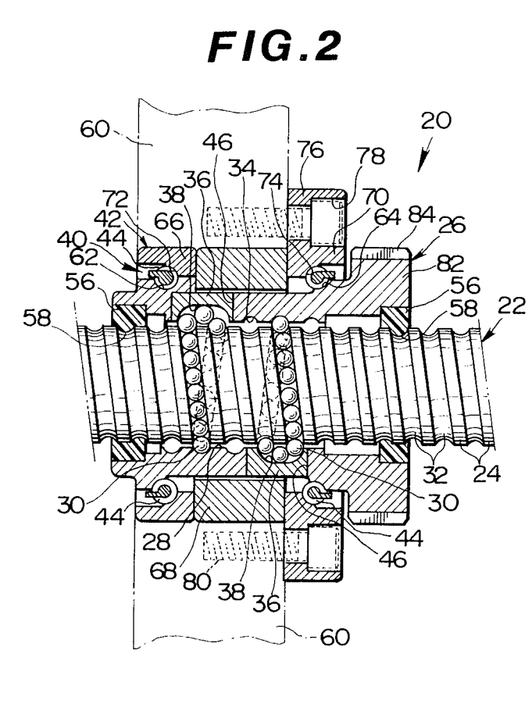
FIG. 2 is an axial section through the rotary-to-linear converter, taken along the line II—II of FIG. 1.

Reference is first directed to FIGS. 1 and 2 in order to describe the general organization of the rotary-to-linear converter illustrated therein by way of a first preferable embodiment of the invention. Generally designated 20, the illustrated rotary-to-linear converter broadly comprises:

1. A worm 22 having a screw thread 24 formed thereon.

2. A ball nut 26 concentrically encircling the worm 22 and having a screw thread 28 formed on part of its inner face.

3. One or more, two in the illustrated embodiment, groups of antifriction balls 30 interposed between worm 22 and ball nut 26 for rolling movement in the helical grooves 32 and 34 defined therein by the threads 24 and 28.

4. One or more, two in the illustrated embodiment, deflectors 36 embedded in the ball nut 26 and each defining a crosscut 38 for the recirculation of one group of balls 30.

5. An antifriction bearing 40 comprising a segmented outer ring 42 and two rows of balls 44 and utilizing the ball nut 26 as the inner ring.

Hereinafter in this specification the balls 30 between worm 22 and ball nut 26 will be referred to as the converter balls, and the balls 44 between ball nut 26 and outer ring 42 as the bearing balls, by way of contradistinction from each other.

Figure 3:
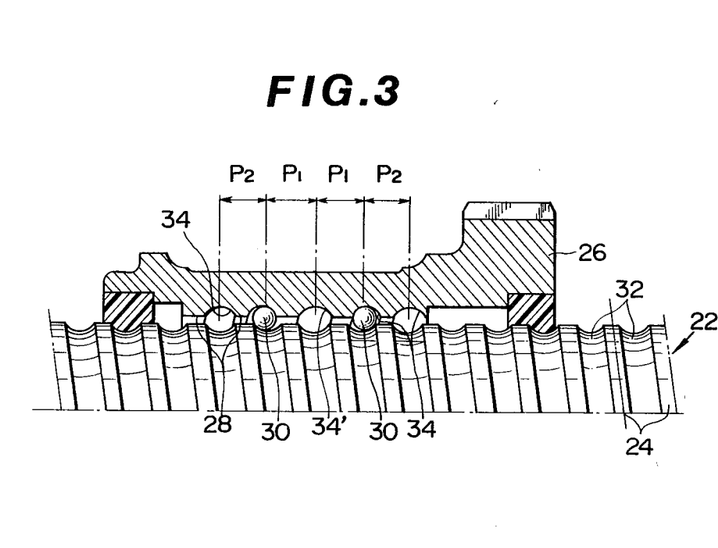
FIG. 3 is an enlarged axial section, taken along the line III—III of FIG. 1, through the worm and ball nut of the rotary-to-linear converter, the view being explanatory of the way in which the two groups of antifriction balls are preloaded in the opposite axial directions of the converter.

FIG. 3 is an enlarged representation of the worm 22, the ball nut 26, and the two groups of converter balls 30 rollably engaged between their opposed threads 24 and 28. This figure shows only one converter ball of each group for simplicity. The worm 22 has the screw thread 24 defining the helical groove 32 to serve as the path for the converter balls 30. The ball nut 26, on the other hand, has the internal screw thread 28 defining the helical groove 34 to serve as the ball path. The thread 24 on the worm 22 has a constant pitch throughout its axial length. The turns of the internal thread 28 on the ball nut 26, however, have a difference in pitch for preloading the converter balls 30, as discussed in more detail hereafter.

Of the illustrated five turns of the helical groove 34 in the ball nut 26, the middle turn 34' is made greater in width than the other turns of the groove in this particular embodiment. Thus the pitches P1 between this middle turn 34' and the adjacent turns are longer than the pitches P2 between the turns other than the middle turn. Since all the turns of the helical groove 32 in the worm 22 are pitched equally, the wider middle turn 34' of the helical groove in the ball nut 26 functions to preload the two groups of converter balls 30 away from each other, or approximately axially outwardly of the ball nut or of the worm.

Alternatively the middle turn 34' of the helical groove in the ball nut 26 may be made smaller in width than the other turns. In this case the two groups of converter balls 30 will be preloaded toward each other, or approximately axially inwardly of the ball nut or of the worm. All that is required, therefore, for preloading the converter balls in accordance with the invention is to make the middle turn of the helical groove in the ball nut different in width from the other turns.

With reference back to FIG. 2 the two deflectors 36 are closely fitted in respective elliptical apertures 46 formed radially through the ball nut 26 in axially spaced, diametrically opposite positions thereon. A suitable adhesive may be used for firmly retaining the deflectors 36 in position in the ball nut apertures 46.

Figure 4:
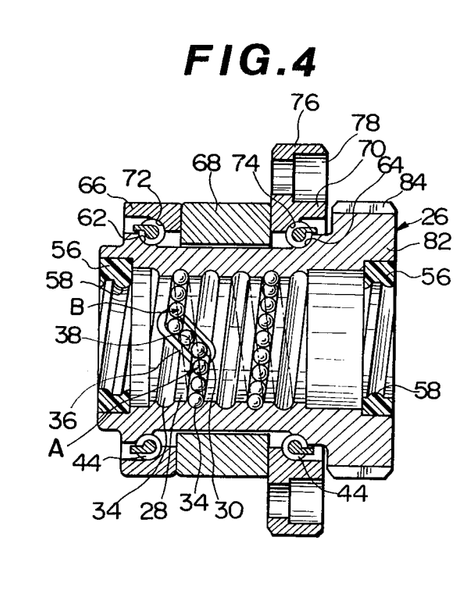
FIG. 4 is also an axial section through the rotary-to-linear converter, taken along the line IV-IV of FIG. 1, the view not showing the worm to clearly reveal one of the crosscuts formed across the internal screw thread on the ball nut, as well as the balls recirculating through the crosscut.

FIG. 4 shows the interior of the ball nut 26 as angularly displaced 90 degrees from the position of FIG. 2. Only one deflector 36 is seen here. It will be observed that the representative deflector extends across one turn of the internal screw thread 28 on the ball nut 26 and is angled in the direction opposite to that in which the thread inclines from a plane normal to the axis of the ball nut. Thus the deflector 36 provides the crosscut 38 across the ball nut thread for the recirculation of one group of converter balls 30. It is understood that the other deflector, not seen in FIG. 4, is arranged similarly to provide another crosscut for the recirculation of the other group of converter balls.

Figure 5:
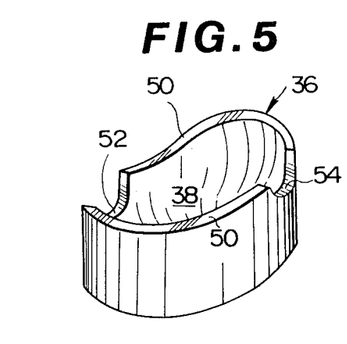
FIG. 5 is an enlarged perspective of one of the deflectors defining the crosscuts on the inner face of the ball nut.
Figure 6:
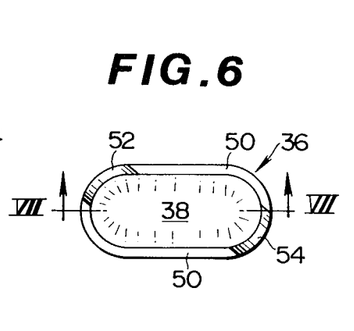
FIG. 6 is a plan of the deflector of FIG. 5.
Figure 7:
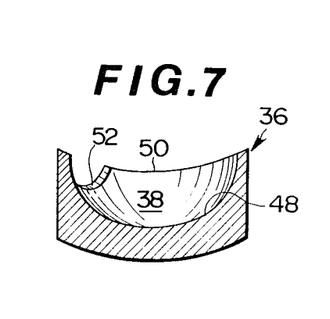
FIG. 7 is a longitudinal section through the deflector, taken along the line VII—VII of FIG. 6.

An inspection of FIGS. 5, 6 and 7 will make clear the configuration of each deflector 36. Generally in the shape of a short column of elliptical cross section, the deflector 36 has an elongate concavity, with a rounded bottom 48, formed in one face to serve as the crosscut 38. The concavity or crosscut 38 may be thought of as being bounded in part by a raised surrounding wall 50. Adjacent the opposite extremities of the surrounding wall 50, and in positions slightly offset in the opposite directions, there are formed a pair of approximately semicircular recesses 52 and 54. When the deflector 36 is inserted to a proper position in one aperture 46 in the ball nut 26 as in FIGS. 2 and 4, the recesses 52 and 54 therein become flush with the two neighboring turns of the helical groove 34 in the ball nut, thus assuring the smooth entrance and exit of the converter balls 30 into and out of the concavity. The rounded bottom 48 of the concavity serves to provide a bypass for the converter balls around the thread 24 on the worm 22.

It will have been seen that the crosscut 38 defined by each deflector 36 intercommunicates two neighboring turns of the helical groove 34 in the ball nut 26. The two intercommunicated groove turns are, of course, continuous, so that the converter balls 30 recirculate along essentially one turn of the helical groove in the ball nut 26.

Figure 8:
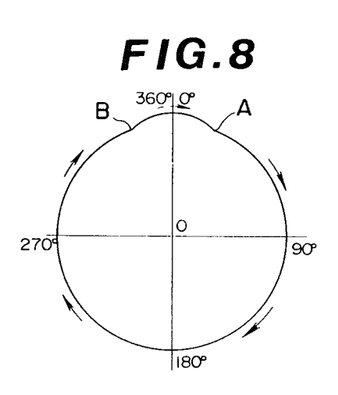
FIG. 8 illustrates the trajectory of each group of balls recirculating between the worm and ball nut of the rotary-to-linear converter through the crosscut in the ball nut.

FIG. 8 depicts the orbit of each group of recirculating converter balls 30 as viewed from either axial end of the worm 22. Let A in this figure be the notional starting point of the converter balls rolling in a clockwise direction, for example, around the worm. As indicated in FIG. 4, the starting point A is located on either of the semicircular recesses 52 and 54 in one of the deflectors 36. From this starting point the converter balls roll in the grooves 32 and 34 in the worm and the ball nut. After making nearly one complete turn around the worm the converter balls reach the point B, where they enter the crosscut 38. It will be recalled by referring back to FIGS. 1 or 7 that the crosscut 38 is concaved outwardly with a radius considerably less that that of the worm 22. Consequently, by rolling in the crosscut, the converter balls detour the thread 24 on the worm 22 and so come back to the initial position A, completing a 360-degree revolution around the worm. Each group of converter balls 30 endlessly recirculate through one turn of the ball nut groove as either of the worm and the ball nut is revolved to cause axial displacement of the other.

If, in FIG. 8, the position of zero or 360 degrees is in the middle of the crosscut 38, then the points A and B may be angularly spaced 20 degrees in opposite directions therefrom. The crosscut extends between the 340- and 20-degree positions in this particular embodiment.

As has been stated, the illustrated embodiment employs two deflectors 36 to allow the recirculation of the two separate groups of converter balls 30. If required, however, more than two such deflectors may be provided for the recirculation of as many groups of converter balls. In these cases, too, the deflectors should be arranged at constant angular spacings on the ball nut. It is to be noted that, taken in its broadest aspect, the invention admits of the use of only one deflector for the recirculation of a single group of converter balls, even though the preloading of the converter balls by the scheme of FIG. 3 will become impossible. The relative displacement of the worm and the ball nut out of axial alignment with each other, due to the interposition of the single group of converter balls therebetween, need not be worried by reason of the presence of a pair of sealing rings 56, best seen in FIGS. 2 and 4, at the opposite axial ends of the ball nut.

The pair of sealing rings 56 are firmly attached to the inner face of the ball nut 26, at its opposite axial ends, and are directed inwardly therefrom into sliding engagement with the worm 22. Preferably molded from a rigid plastic or hard rubber having a wear-resisting property, the sealing rings 56 are internally screw threaded at 58 to mate with the thread 24 on the worm 22. These rings seal the ends of the ball nut 26 against the intrusion of dust and other foreign matter. Also, by relatively sliding over the worm 22, the sealing rings function to prevent dust accumulation on the worm. The rolling of the converter balls in a dust-free state is of utmost significance for the proper operation of the machine.

FIGS. 2 and 4 also best illustrate the antifriction bearing 40 for use in rotatably mounting the ball nut 26 to some external part such as the one drawn in phantom outline and designated 60 in FIG. 2. In its simplest form the bearing to be incorporated in the rotary-to-linear converter in accordance with the invention comprises a ring concentrically surrounding the ball nut, and a row of rolling elements confined therebetween. The particular bearing 40 in the illustrated embodiment is, however, shown as a double-row ball bearing.

For rollably holding the two rows of bearing balls 44 the ball nut 26 serving as the inner ring of the bearing has a pair of ball races 62 and 64 formed annularly on its outside face, in the vicinities of its opposite axial ends. The pair of ball races 62 and 64 on the ball nut 26 are angled toward each other in this particular embodiment. The outer ring 42 of the bearing, on the other hand, is shown divided into three segments consisting of a left hand segment 66, a middle segment 68, and a right hand segment 70, all in annular form. The two outer segments 66 and 70 of the outer ring have formed therein ball races 72 and 74, respectively, which are angled away from each other and opposed to the respective ball nut races 62 and 64. The two rows of bearing balls 44 are rollably caught between the ball nut races 62 and 64 and the outer ring races 72 and 74.

In the assemblage of the double-row ball bearing constructed as in the foregoing the middle segment 68 of the outer ring 42 is mounted in place after mounting its outer segments 66 and 70 on the ball nut 26 via the two rows of bearing balls 44. To make this possible the middle segment 68 may be diametrically split into a pair of halves. The thickness or axial dimension of the middle segment 68 is so determined in relation to the other parts of the bearing that, when mounted in position, the middle segment urges the two outer segments 66 and 70 away from each other. Thus the two rows of bearing balls 44 are preloaded in the axially outward directions of the bearing.

It will be noted that the right hand segment 70 of the outer ring 42 is made considerably greater in outside diameter than the other segments 66 and 68. This is because the right hand segment 70 is intended to serve as a mounting flange in fastening the outer ring 42 of the bearing as to the external part 60. As seen in both FIGS. 1 and 2, the mounting flange 76 has a plurality of countersunk holes 78 formed therethrough for the reception of threaded fastener elements depicted in phantom outline at 80 in FIG. 2.

With reference to FIGS. 2 and 4 the right hand end 82 of the ball nut 26 projects beyond the outer ring 42 of the bearing 40 and is made greater in outside diameter than the other portion of the ball nut. The greater diameter end portion 82 of the ball nut has a set of gear teeth 84 formed on its outer surface to serve as a driven gear in imparting rotation to the ball nut by being driven from an external drive source. The gear-toothed end portion 82 of the ball nut will therefore be hereinafter referred to as the driven gear portion, or simply as the gear portion, of the ball nut.

It must be pointed out that the creation of the gear teeth on the projecting end portion of the ball nut does not constitute an essential feature of the invention. As a possible alternative a set of grooves may be cut in the projecting end portion of the ball nut, in a direction parallel to its axis, for the use of this portion as a timing belt pulley.

Second Form

Figure 9:
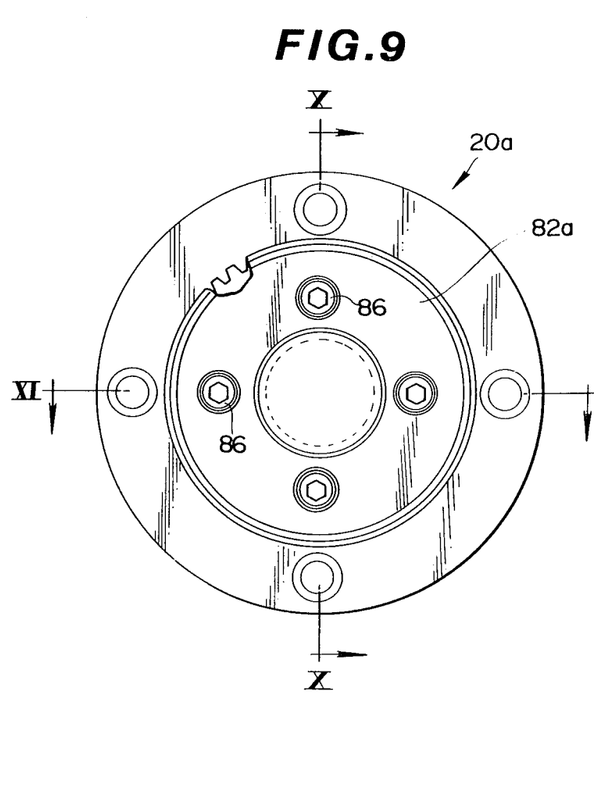
FIG. 9 is an end elevation of another preferred form of the rotary-to-linear converter constructed in accordance with the principles of the invention.
Figure 10:
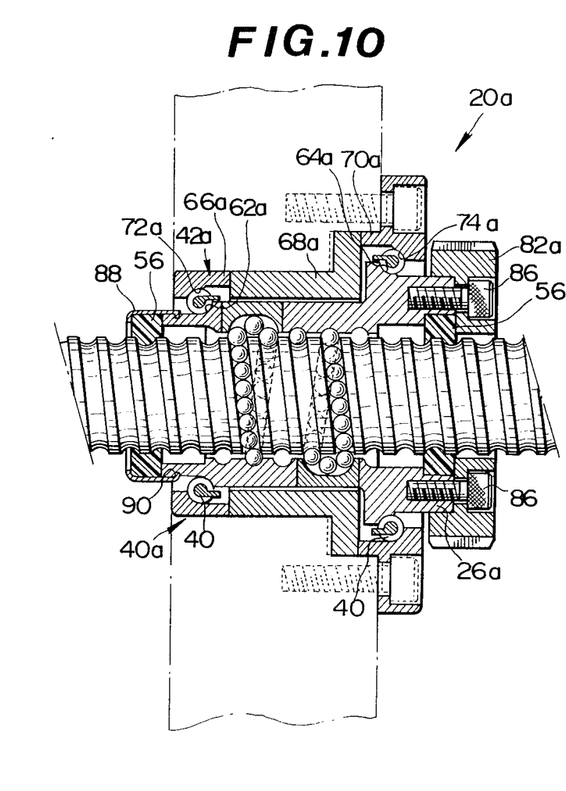
FIG. 10 is an axial section through the alternative rotary-to-linear converter, taken along the line X—X of FIG. 9.
Figure 11:
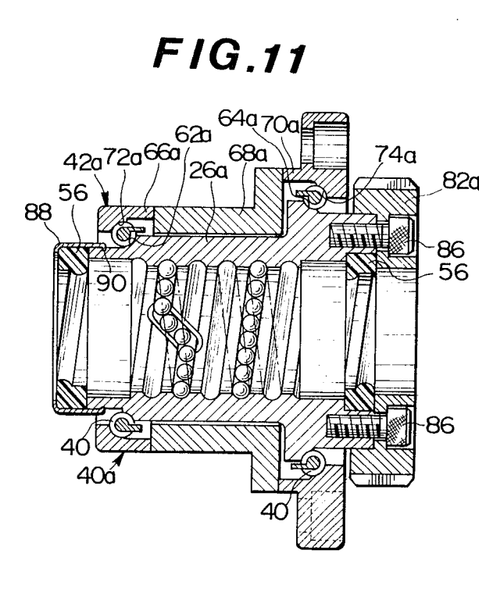
FIG. 11 is also an axial section through the alternative rotary-to-linear converter, taken along the line XI—XI of FIG. 9, the view not showing the worm to reveal other parts.

FIGS. 9, 10 and 11 illustrate an alternative form of the rotary-to-linear converter, generally designated 20a in FIGS. 9 and 10, incorporating several modifications of the preceding embodiment. One of the modifications resides in an annular or hollow gear 82a formed as a separate unit and screwed at 86 to one end of the ball nut 26a in coaxial relationship thereto. An annular timing belt pulley could of course be used in place of the gear 82a. The fastening of such an annular driven member to the ball nut makes it possible to firmly engage one of the internally threaded sealing rings 56 therebetween. The other sealing ring 56 is held against the other end of the ball nut and firmly supported by an annular retainer 88. This retainer is partly fitted over the ball nut 26a and has an inwardly turned rim 90 embedded therein.

The alternative rotary-to-linear converter 20a further includes a modified bearing 40a, which also is of the double-row ball type. The ball nut 26a has formed therein two annular ball races 62a and 64a which are angled away from each other, unlike the ball races 62 and 64 of the preceding embodiment which are angled toward each other.

As in the preceding embodiment the outer ring 42a of the bearing is split into three annular segments 66a, 68a and 70a. The two outer segments 66a and 70a of the outer ring have formed therein ball races 72a and 74a which are angled toward each other and opposed to the ball nut races 62a and 64a respectively. The two rows of bearing balls 40 are rollably confined between the ball nut races 62a and 64a and the outer ring races 72a and 74a. In this modified double-row ball bearing 40a the two outer segments 66a and 70a of the outer ring are compressed and held urged against the middle segment 68a by suitable means, not shown, so as to preload the two rows of bearing balls 40 toward each other.

The other details of construction of the alternative rotary-to-linear converter 20a are identical with those of the converter 20. Its operation will also be apparent from the foregoing description of the converter 20.

Feed Mechanism

Figure 12:
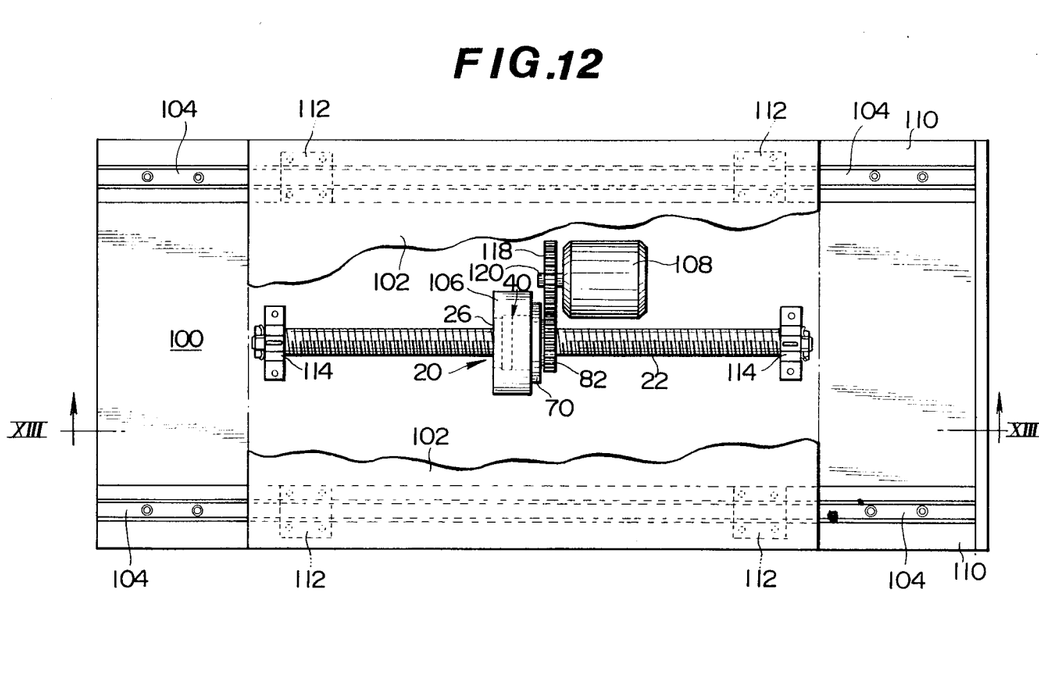
FIG. 12 is a top plan, with a part shown broken away to reveal other parts, of a feed mechanism utilizing the rotary-to-linear converter of FIGS. 1 to 8.
Figure 13:
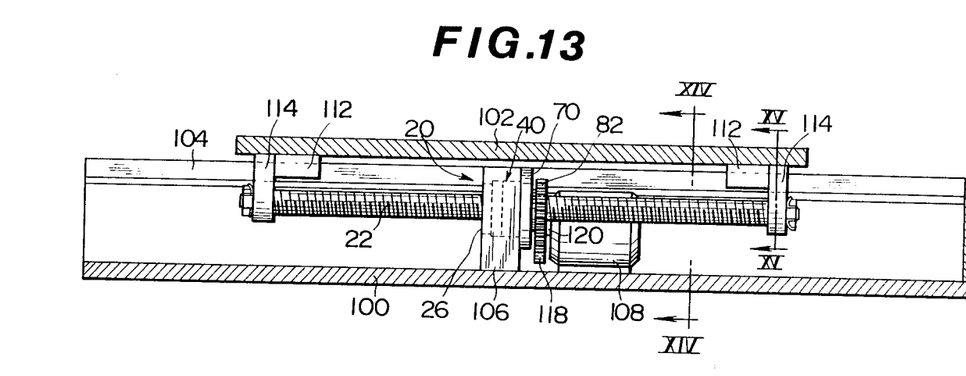
FIG. 13 is a longitudinal, vertical section through the feed mechanism, taken along the line XIII—XIII of FIG. 12.
Figure 14:
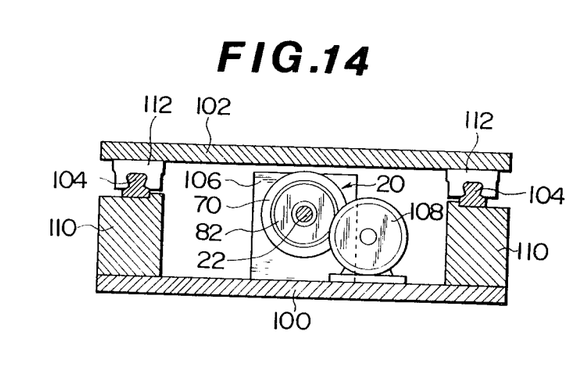
FIG. 14 is a transverse, vertical section through the feed mechanism, taken along the line XIV—XIV of FIG. 13.
Figure 15:
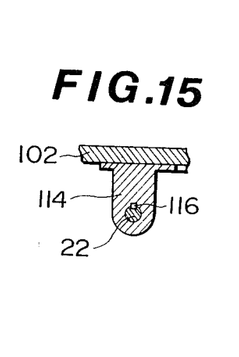
FIG. 15 is a vertical section, taken along the line XV—XV of FIG. 13, through one of the depending lugs for rigidly mounting the worm of the rotary-to-linear converter on the underside of the table in the feed mechanism.

FIGS. 12 to 15 show the rotary-to-linear converter 20 of FIGS. 1 to 8 as adapted for use as a feed mechanism. With particular reference to FIGS. 12 to 14 the feed mechanism broadly comprises 1. A stationary bed 100 laid horizontally.
2. A table 102 to be fed along a pair of guide rails 104 on the bed 100.
3. The rotary-to-linear converter 20 comprising the worm 22 rigidly supported under the table 102 and oriented parallel to the guide rail pair 104, and the ball nut 26 rotatably mounted via the bearing 40 to a fixed support 106 on the bed 100.
4. An electric stepper motor 108 on the bed 100 geared to the ball nut 26 for imparting bidirectional rotation thereto.

Laid on respective support beams 110 on the bed 100, the pair of guide rails 104 serves as a track for the rectilinear movement of the table 102 over the bed as the table is fed in either direction by the rotary-to-linear converter 20. The table 102 has two pairs of shoes 112 on its underside which preferably make rolling contact with the guide rail pair 104 to allow frictionless travel of the table thereon.

The table 102 has a pair of lugs 114 depending therefrom for carrying the worm 22. As better shown in FIG. 15, each depending lug 114 is bored therethrough to receive one of the opposite end portions of the worm 22. This worm is keyed at 116 to each lug 114 and restrained from both rotary and axial movements relative to the table 102. The worm 22 is, however, movable axially relative to the bed 100, so that the table 102 can be fed along the guide rail pair 104 by imparting axial thrust to the worm.

As has been explained in conjunction with FIGS. 1 to 8, the ball nut 26 of the rotary-to-linear converter 20 is sleeved upon the worm 22 via the two groups of recirculating converter balls not seen in FIGS. 12 to 14, to cause the desired axial displacement of the worm by being revolved by the stepper motor 108. To cause such axial displacement of the worm 22 the ball nut 26 must itself be rotatable relative to the worm but must be locked against axial movement relative to the bed 100. Thus the ball nut 26 is rotatably mounted to the fixed support 106 on the bed 100 via the double-row ball bearing 40. It has been mentioned with reference to FIGS. 2 and 4 that the outer ring of this bearing is split into three annular segments and that the right hand segment 70 is made greater in outside diameter than the others to serve as a mounting flange. The right hand segment 70 of the bearing outer ring is screwed to the fixed support 106 on the bed 100 in the manner illustrated in FIG. 2. In this figure the external part 60 to which the outer ring segment 70 of the bearing is fastened corresponds to the fixed support 106.

As the outer ring of the bearing 40 is screwed as above to the fixed support 106, the ball nut 26 doubling as its inner ring becomes locked against axial displacement relative to the bed via the two rows of bearing balls interposed therebetween. The ball nut 26 is nevertheless rotatable relative to the worm 22.

For imparting bidirectional rotation to the ball nut 26 the stepper motor 108 has a drive gear 118 nonrotatably mounted on its output shaft 120. The drive gear 118 meshes with the driven gear portion 82 of the ball nut 26 projecting out of the bearing outer ring.

In the operation of the feed mechanism constructed as above described with reference to FIGS. 12 to 15, the stepper motor 108 on being energized in the known manner drives the ball nut 26 in a desired direction via the drive gear 118 and the driven gear 82 integral with the ball nut. Since the ball nut 26 is immovable axially relative to the bed 100 as aforesaid, its rotation results in the relative axial displacement of the worm 22 in a direction determined by the direction of rotation of the ball nut. As the worm 22 travels endwise in either direction relative to the bed 100, so does the table 102 along the guide rail pair 104.

Two-Speed Feed Mechanism

Figure 16:
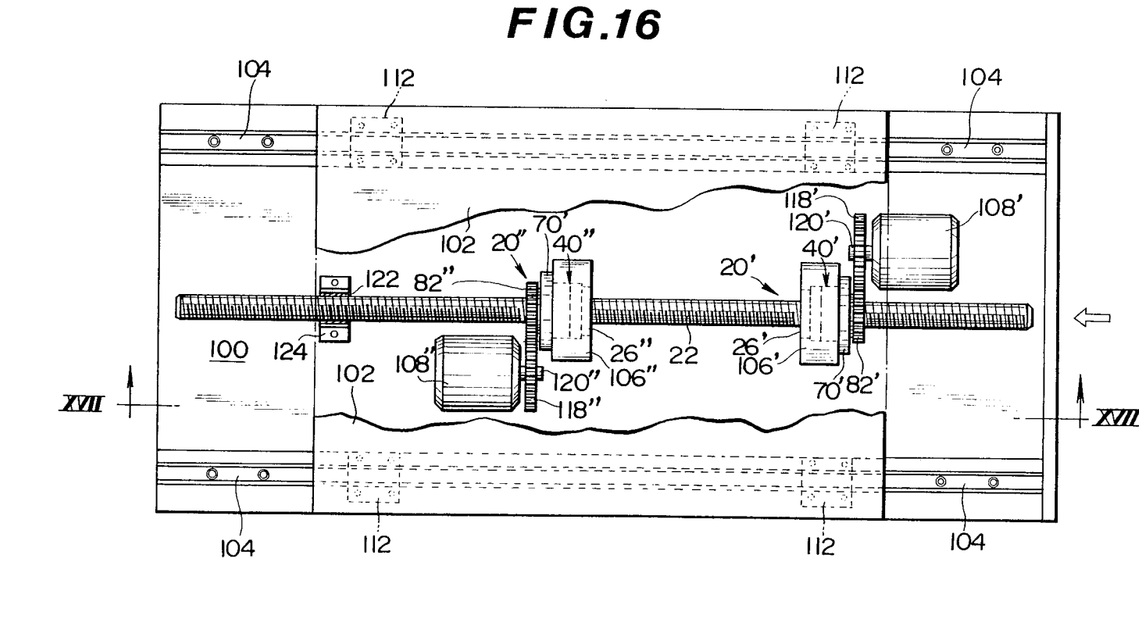
FIG. 16 is a top plan, with a part shown broken away to reveal other parts, of a two-speed feed mechanism incorporating two rotary-to-linear converters each constructed as in FIGS. 1 to 8 and both sharing the worm.
Figure 17:
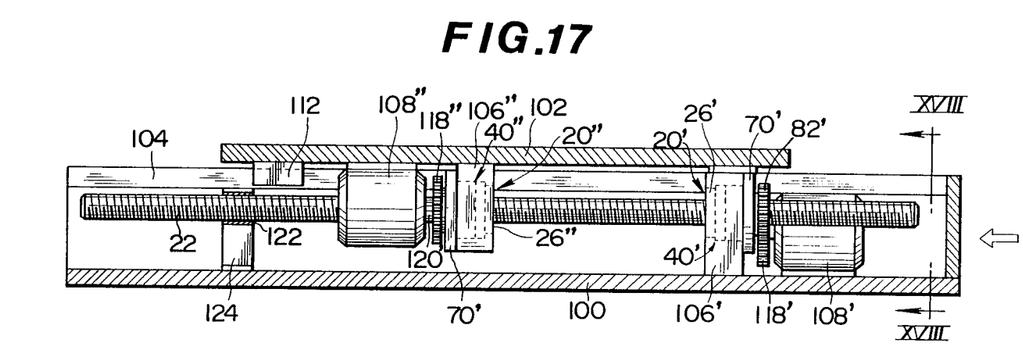
FIG. 17 is a longitudinal, vertical section through the two-speed feed mechanism, taken along the line XVII—XVII of FIG. 16.
Figure 18:
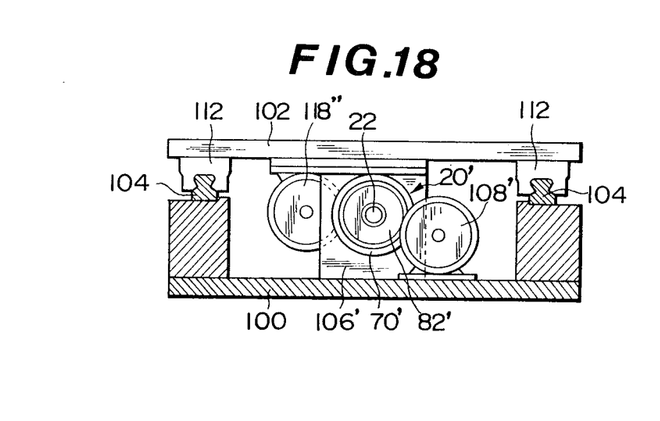
FIG. 18 is a transverse, vertical section through the two-speed feed mechanism, taken along the line XVIII—XVIII of FIG. 17.

In FIGS. 16 to 18 is shown another feed mechanism incorporating two rotary-to-linear converters 20' and 20", each constructed as in FIGS. 1 to 8 and sharing the worm 22, for feeding an object at high and low speeds. In the following description of this two-speed feed mechanism the reference numerals used to denote various parts of the rotary-to-linear converter 20 in the preceding embodiments will be primed to designate the corresponding parts of the first converter 20', and double-primed to designate the corresponding parts of the second converter 20", except the worm 22 shared by both. Also the reference numerals used to denote the parts of the drive means in the feed mechanism of FIGS. 12 to 15 will be primed to designate the corresponding parts of the drive means for the first converter 20', and double-primed to designate the corresponding parts of the drive means for the second converter 20".

The following is a list of the principal components of the two-speed feed mechanism:

1. The stationary bed 100.
2. The table 102 having the two pairs of shoes 112 for reciprocating movement along the pair of guide rails 104 on the bed 100.
3. The worm 22 disposed under the table 102 and extending parallel to the guide rail pair 104.
4. First 26' and second 26" ball nuts sleeved upon the worm 22 via the recirculating converter balls, not seen in FIGS. 16 to 18, in axially spaced positions thereon.
5. A first bearing 40' rotatably supporting the first ball nut 26' on the bed 100.
6. A second bearing 40" rotatably supporting the second ball nut 26" on the underside of the table 102.
7. A first stepper motor 108' on the bed 100 for imparting bidirectional rotation to the first ball nut 26'.
8. A second stepper motor 108" on the underside of the table 102 for imparting bidirectional rotation to the second ball nut 26".

It will have been noted that the worm 22 is not secured to the table 102 as in the preceding embodiment but is supported by the first ball nut 26' on the bed 100 and by the second ball nut 26" on the table 102. Additionally a sleeve bearing 122 mounted to a bearing holder 124 on the bed 100 is fitted over the worm 22 to guide it axial movement relative to the bed 100 and the table 102. Thus the worm 22 is supported at three longitudinally spaced points thereon.

The first ball nut 26' is rotatably mounted to a fixed support 106' on the bed 22 via the first bearing 40'. As in the preceding embodiment the outer ring segment 70' of this bearing is screwed to the fixed support 106'. Consequently the first ball nut 26' is restrained from axial displacement relative to the bed 100 but is rotatable relative to the bed and the table 102, so that the rotation of the first ball nut results in the axial movement of the worm 22 relative to at least the bed 100.

The first stepper motor 108' on the bed 100 has a first drive gear 118' nonrotatably mounted on its output shaft 120'. The first drive gear 118' meshes with the driven gear portion 82' of the first ball nut 26'.

The second ball nut 26" is rotatably mounted to a movable support 106" on the underside of the table 102 via the second bearing 40". The second bearing has also its outer ring segment 70" screwed to the movable support 106". This movable support is in fixed relation to the table 102. The support 106" is called movable simply because it moves relative to the bed 100. The second ball nut 26" is therefore axially displaceable relative to the bed 100 but is not so relative to the table 102, and is rotatable relative to the bed and the table. Accordingly the rotation of the second ball nut 26" results in its own axial movement, together with the table 102, relative to the worm 22.

The second stepper motor 108" is immovably supported on the underside of the table 102. Nonrotatably mounted on the output shaft 120" of the second stepper motor 108", a second drive gear 118" meshes with the driven gear portion 82" of the second ball nut 26".

What follows is the description of operation of the two-speed feed mechanism. The operational description presupposes that all the screw threads in question are cut right-handed. Also the terms indicating the directions of rotation of the pertinent parts should be understood to be as viewed from the right hand side of FIGS. 16 and 17, as indicated by the arrows in these figures.

The feeding of the table 102 at high speed in either direction requires the rotations of the two ball nuts 26' and 26" in opposite directions. For feeding the table 102 leftwardly, as seen in FIGS. 16 and 17, at high speed, the first ball nut 26' may be revolved in a counterclockwise direction, and the second ball nut 26" in a clockwise direction, by the respective stepper motors 108' and 108". The counterclockwise rotation of the first ball nut 26', itself locked against axial displacement relative to the bed 100, results in the leftward endwise movement of the worm 22 relative to the bed. The clockwise rotation of the second ball nut 26", on the other hand, results in its own leftward axial movement relative to the worm 22, which is also travelling leftwardly relative to the bed 100. Since the table 102 is constrained to joint linear movement with the second ball nut 26", the travelling speed of the table relative to the bed 100 is the sum of the travelling speed of the worm 22 relative to the bed and the travelling speed of the second ball nut relative to the worm. In short the table 102 moves twice as fast as the table in the feed mechanism of FIGS. 12 to 15, provided that the output speeds of all the stepper motors 108, 108' and 108" are equal.

For feeding the table 102 rightwardly at high speed the first ball nut 26' may be revolved in a clockwise direction, and the second ball nut 26" in a counterclockwise direction, by the respective stepper motors 108' and 108". How the revolutions of the two ball nuts in the specified directions result in the high speed movement of the table to the right is considered self-evident from the foregoing description of the high speed leftward movement of the table.

The following is the discussion of the way in which the table 102 is fed at greatly reduced speed. The low speed feeding of the table requires the rotation of the first 26' and second 26" ball nuts in the same direction but at different speeds.

For feeding the table 102 to the left at low speed the first ball nut 26' may be revolved in a counterclockwise direction at one speed, and the second ball nut 26" in the same direction but at another speed less than the revolving speed of the first ball nut, by the respective stepper motors 108' and 108". The counterclockwise rotation of the first ball nut 26' results as aforesaid in the leftward endwise movement of the worm 22 relative to the bed 100. The second ball nut 26", on the other hand, on counterclockwise rotation travels to the right relative to the worm 22. The resultant of these relative motions is the leftward travel of the table 102 relative to the bed 100, since the output speed of the first stepper motor 108' is more than that of the second stepper motor 108". The table 102 travels to the left relative to the bed 100 at a speed corresponding to the difference between the speed of the leftward endwise movement of the worm 22 relative to the bed and the speed of the rightward axial movement of the second ball nut 26" relative to the worm. It will be seen, then, that the travelling speed of the table relative to the bed can be made extremely low by setting the output speeds of the two stepper motors close to each other. The smaller the difference between the output speeds of the stepper motors, the more slowly will the table move relative to the bed.

It is clear from the foregoing that, for feeding the table 102 to the right at low speed, both first 26' and second 26" ball nuts are to be revolved in a clockwise direction, but with the first ball nut at a higher speed than the second, by the stepper motors 108' and 108". Then the table 102 will travel to the right relative to the bed 100 at a speed corresponding to the difference between the speed of the rightward endwise movement of the worm 22 relative to the bed and the speed of the leftward axial movement of the second ball nut 26" relative to the worm.

Although the two feed mechanisms disclosed herein incorporate the rotary-to-linear converters constructed as in FIGS. 1 to 8, it will be understood that the device of FIGS. 9 to 11 could be used in the feed mechanisms without any alteration of the other parts thereof. Further, while it will be apparent that the preferred embodiments of the invention herein disclosed are well calculated to fulfill the objective above stated, it will be appreciated that the invention itself is susceptible to modification, variation and change without departing from the proper scope or fair meaning of the appended claims.

What is claimed is:

1. A rotary-to-linear converter capable of translating rotary motion into rectilinear motion, comprising:
   (a) a worm having a screw thread formed thereon;
   (b) a ball nut sleeved upon the worm and having an internal screw thread formed thereon;
   (c) a group of antifriction balls interposed between the worm and the ball nut for rolling motion along the threads thereon;
   (d) there being a first and a second crosscut each formed across the internal thread on the ball nut for intercommunicating two neighboring turns of a helical groove defined therein by the internal thread, the first and second crosscuts being axially displaced relative to one another, thus dividing said balls into a first and second group;
   (e) an antifriction bearing for rotatably supporting the ball nut, the bearing comprising an inner ring formed by the outer surface of the ball nut, an outer ring concentrically surrounding the ball nut, and a plurality of rolling elements disposed between the outer ring and the ball nut; and
   (f) there being a turn of the helical groove at the midportion of the ball nut different in width from the other turns of the helical groove for preloading the first and second groups of balls in opposite axial directions with respect to the ball nut.

2. A rotary-to-linear converter as recited in claim 1, wherein each crosscut is defined by a deflector embedded in the ball nut.

3. A rotary-to-linear converter as recited in claim 2, wherein each deflector has formed therein an elongate concavity serving as the crosscut, and a pair of approximately semicircular recesses for the entrance and exit of the balls into and out of the concavity.

4. A rotary-to-linear converter as recited in claim 1, wherein the first and second crosscuts are disposed in diametrically opposite positions on the inner face of the ball nut.

5. A rotary-to-linear converter as recited in claim 1, wherein the ball nut has one end projecting beyond the outer ring of the bearing, the projecting end of the ball nut being adapted to be coupled to a separate drive source to be rotated thereby.

6. A rotary-to-linear converter as recited in claim 1, wherein the rolling elements of the bearing are arranged in two rows, and wherein the outer ring of the bearing comprises two outer segments each confining one row of rolling elements between itself and the ball nut, and a middle segment interposed between the two outer segments, in order to allow the two rows of rolling elements to be preloaded in the opposite axial directions of the bearing.

7. A rotary-to-linear converter as recited in claim 6, wherein one of the outer segments of the outer ring of the bearing is made greater in outside diameter than the other segments thereof to serve as a mounting flange.

8. A rotary-to-linear converter as recited in claim 1, further comprising a pair of sealing rings formed coaxially at the opposite axial ends of the ball nut and directed inwardly therefrom into sliding engagement with the worm.

9. A rotary-to-linear converter as recited in claim 8, wherein each sealing ring has an internal screw thread formed thereon to mate with the thread on the worm.

10. A rotary-to-linear converter as recited in claim 1, further comprising an annular driven member coaxially attached to one end of the ball nut to impart rotation thereto be being driven from a separate drive source.

11. A rotary-to-linear converter as recited in claim 10, further comprising a pair of sealing rings mounted coaxially on the opposite axial ends of the ball nut and directed inwardly therefrom into sliding engagement with the worm, one of the sealing rings being firmly caught between the ball nut and the annular driven member.

12. A rotary-to-linear converter as recited in claim 10, further comprising a retainer for firmly holding the other sealing ring in position on the ball nut.

13. A feed mechanism comprising:
   (a) a stationary member;
   (b) a movable member reciprocably movable along a rectilinear track over the stationary member;
   (c) a worm fixedly mounted on the underside of the movable member and extending parallel to the track, the worm being movable axially with the movable member relative to the stationary member;
   (d) a ball nut sleeved upon the worm;
   (e) a group of antifriction balls interposed between the worm and the ball nut for rolling motion along an external screw thread on the former and an internal screw thread on the latter;
   (f) there being a first and a second crosscut each formed across the internal thread on the ball nut for intercommunicating two neighboring turns of a helical groove defined therein by the internal thread, the first and second crosscuts being axially displaced relative to one another, thus dividing said balls into a first and a second group;
   (g) an antifriction bearing for rotatably supporting the ball nut, the bearing comprising an inner ring formed by the outer surface of the ball nut, an outer ring concentrically surrounding the ball nut, and a plurality of rolling elements disposed between the outer ring and the ball nut, the outer ring being fixedly supported on the stationary member whereby the ball nut is rotatable relative to the worm and is restrained from axial movement relative to the stationary member;
   (h) drive means on the stationary member for imparting bidirectional rotation to the ball nut; and
   (i) there being a turn of the helical groove at the midportion of the ball nut different in width from the outer turns of the helical groove for preloading the first and second groups of balls in opposite axial directions with respect to the ball nut.

14. A feed mechanism as recited in claim 13, further comprising a pair of sealing rings formed coaxially at the opposite axial ends of the ball nut and directed inwardly therefrom into sliding engagement with the worm.

15. A feed mechanism as recited in claim 13, wherein the ball nut has a set of gear teeth formed on one end thereof projecting beyond the ring of the bearing, and wherein the drive means comprises a motor mounted on the stationary member, and a drive gear mounted on an output shaft of the motor and meshing with the gear teeth on the ball nut.

16. A two-speed feed mechanism comprising:
    (a) a stationary member;
    (b) a movable member reciprocably movable along a rectilinear track over the stationary member;
    (c) a worm disposed under the movable member and extending parallel to the track;
    (d) first and second ball nuts sleeved upon the worm in axially spaced positions thereon;
    (e) a group of antifriction balls interposed between the worm and each ball nut for rolling motion along an external screw thread on the former and an internal screw thread on the latter;
    (f) there being a first and a second crosscut each formed across the internal thread on each ball nut for intercommunicating two neighboring turns of a helical groove defined therein by the internal thread, the first and second crosscuts being axially displaced relative to one another, thus dividing said balls into a first and a second group;
    (g) a first antifriction bearing for rotatably supporting the first ball nut, the first bearing comprising a first inner ring formed by the outer surface of the first ball nut, a first outer ring concentrically surrounding the first ball nut, and a plurality of rolling elements disposed between the first outer ring and the first ball nut, the first outer ring being fixedly supported on the stationary member whereby the first ball nut is rotatable relative to the worm and is restrained from axial movement relative to the stationary member;
    (h) first drive means on the stationary member for imparting bidirectional rotation to the first ball nut;
    (i) a second antifriction bearing comprising a second inner ring formed by the outer surface of the second ball nut, a second outer ring concentrically surrounding the second ball nut, and a plurality of rolling elements confined between the second outer ring and the second ball nut, the second outer ring being fixedly supported on the movable member whereby the second ball nut is rotatable relative to the worm and is restrained from axial movement relative to the movable member;
    (j) second drive means on the movable member for imparting bidirectional rotation to the second ball nut; and
    (k) there being a turn of the helical groove at the midportion of each ball nut different in width from the other turns of the helical groove therein for preloading the first and second groups of balls in opposite axial directions with respect to the ball nut.

17. A two-speed feed mechanism as recited in claim 16, further comprising a pair of sealing rings formed coaxially at the opposite axial ends of each ball nut and directed inwardly therefrom into sliding engagement with the worm.

18. A two-speed feed mechanism as recited in claim 16, wherein each ball nut has a set of gear teeth formed on one end thereof projecting beyond the ring of the corresponding one of the bearings, wherein the first drive means comprises a first motor mounted on the stationary member, and a drive gear mounted on an output shaft of the first motor and meshing with the gear teeth on the first ball nut, and wherein the second drive means comprises a second motor mounted on the movable member, and a drive gear mounted on an output shaft of the second motor and meshing with the gear teeth on the second ball nut.

19. A two-speed feed mechanism as recited in claim 1, further comprising guide means on the stationary member for guiding the linear endwise movement of the worm.

* * * * *